E. M. NEWELL.
AGRICULTURAL IMPLEMENT.
APPLICATION FILED MAY 8, 1909.
933,573.
Patented Sept. 7, 1909.
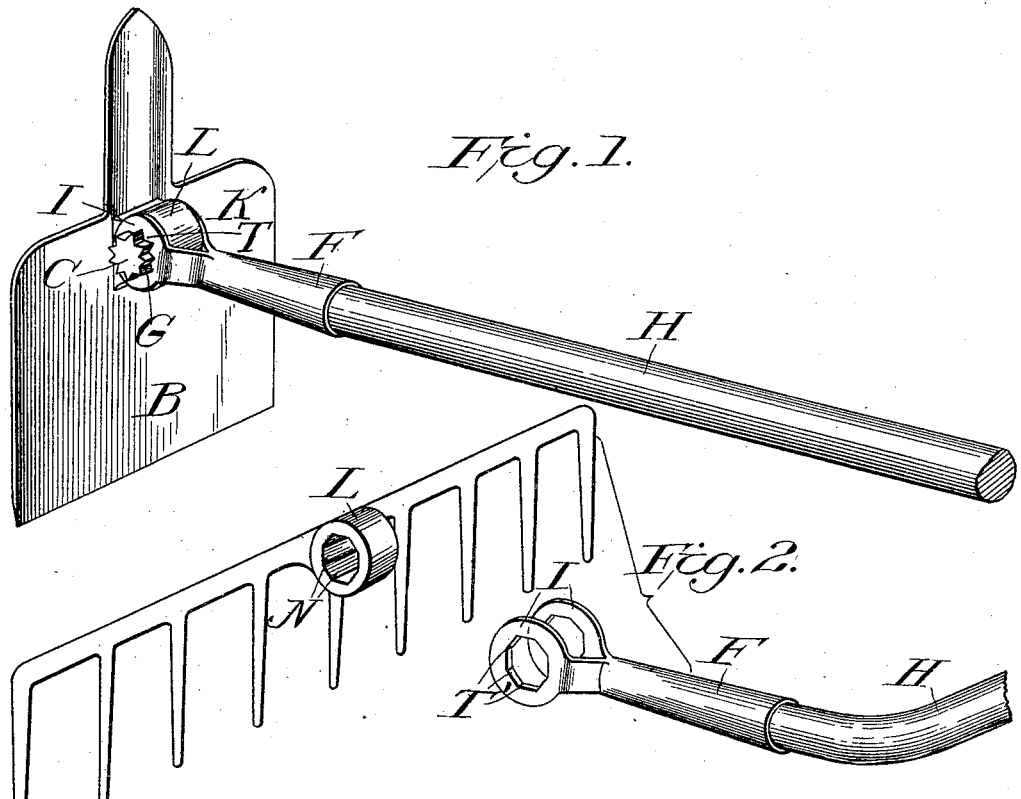
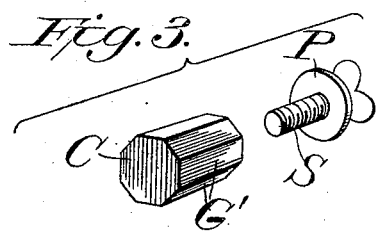
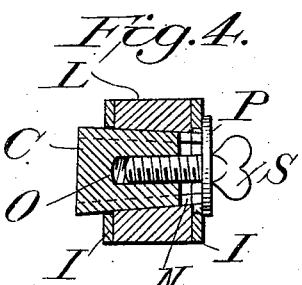
Inventor:
Edward M. Newell,
By
Collamer & Co., Attorneys.
Witnesses:

UNITED STATES PATENT OFFICE.

EDWARD M. NEWELL, OF PEMBINA, NORTH DAKOTA.

AGRICULTURAL IMPLEMENT.

933,573.  Specification of Letters Patent.  Patented Sept. 7, 1909.

Application filed May 8, 1909. Serial No. 494,813.

*To all whom it may concern:*

Be it known that I, EDWARD M. NEWELL, a citizen of the United States, and resident of Pembina, Pembina county, State of North Dakota, have invented certain new and useful Improvements in Agricultural Implements; and my preferred manner of carrying out the invention is set forth in the following full, clear, and exact description, terminating with claims particularly specifying the novelty.

This invention relates to digging implements, such as hoes and rakes, and more especially to those in which the head is adjustable in its position relative to the handle.

To this end the invention consists in an implement having various types of heads, and specifically in the connection between them and the handle which renders them interchangeable and adjustable—all as described below and as shown in the drawings, wherein—

Figure 1 is a perspective view of a hoe constructed in accordance with my invention, the parts being assembled; Fig. 2 is a similar view showing a rake instead of a hoe head, the parts being disconnected; Fig. 3 is a perspective detail of the cone and set screw which have been removed from Fig. 2; and Fig. 4 is an enlarged section through the connection.

In the drawings the letter B designates the blade of this implement, H the handle, and K the connection between them. The blade may be of any type useful in agriculture, but I have considered it necessary to illustrate only a hoe and a rake head although it is quite within the province of the invention that it could be a shovel blade. The construction of the handle, also, is not material to the present invention. In Fig. 1 it is shown straight and in Fig. 2 it is slightly curved, although it is quite within the province of the invention that it could be modified to a considerable extent and might even be a shovel handle. By preference the handle has the usual metal ferrule F at its lower end, and is otherwise of wood.

Coming now more particularly to the present invention, the lower or reduced end of the ferrule is forked or split or formed into two parallel eyes I which are preferably of sheet iron and of circular contour as shown, and of considerable size having inwardly projecting teeth or serrations T around them as shown in Fig. 1, or of angular cross section as shown at T' in Fig. 2. Cast on or secured to the blade about as shown is a lug L of circular contour approximating that of the eyes and of some considerable thickness so as to fit snugly between them when the parts are assembled, and through this lug is formed a transverse tapering hole whose larger end corresponds in size with one of the openings and whose other end is smaller than the other opening—the walls of this tapering hole being angular as at N to correspond with the angular faces T' or notched if teeth or serrations T are employed.

The letter C designates a cone or plug made angular as at G' or having longitudinal grooves or serrations G corresponding in number and size with the angular faces N, and having in its smaller end a threaded opening O in which is removably seated a set screw S. The cone is of such size and length proportionately to the other parts that when the eyes are placed astride the lug and the cone inserted transversely in the openings and hole, the larger end of the cone will project slightly beyond one eye I and its smaller end will stand about flush with the opposite side of the lug L.

In connecting the parts, they are assembled as seen in the drawings, the handle is turned about the axis of the lug until it stands at the proper angle to the blade, the cone is inserted through the opening in one eye and into the larger end of the hole, and the screw is passed through the opening in the other eye and seated in the threaded hole in the smaller end of the cone. Then by tightening up the screw it will be obvious that the parts will be clamped together, and in order to prevent dirt from getting into the connection I preferably provide the set screw beneath its thumb piece with a comparatively large shoulder consisting of a circular plate P whose diameter is greater than the opening in either eye—hence when the screw is tightened up, this plate closes said opening at that side of the fork, while the large end of the cone closes the opening at the other side. Such a connection between the blade and the handle permits the use interchangeably of a number of blades on a single handle or a number of handles on a single blade. If the user desires a hoe he attaches it, or he can apply a rake head or the like at will. If he desires to use a differently shaped handle he can attach it, or if he should desire to reverse a bent handle so that it will be deflected in the opposite direction he can do so. All parts of the connection are of metal, and by being properly treated they can be made rust-proof.

While I have shown the plug C (or more strictly speaking, the truncated cone) and the opening and holes as provided with a number of teeth or serrations, it is obvious that they could be more or less or of different shape even to the extent of forming them of angular configuration on geometric lines such as by being octagonal, etc. as seen in Fig. 2. I prefer, however, not to employ parts which are round in cross section because that would permit the blade to slip in its position of adjustment relative to the handle, especially when the implement was used with vigor, whereas any geometric angularity and especially a toothed or serrated construction such as shown and described would prevent slipping unless the parts became so loose as to be distinctly noticeable.

What is claimed as new is:

1. In an agricultural implement, the combination with a blade, and a lug thereon having a transverse hole provided with longitudinal notches; of a handle, a fork carried thereby formed with eyes having alined openings which are toothed to conform with said notches, a plug shaped exteriorly to fit the openings and hole, and means for holding the plug removably in place.

2. In an agricultural implement, the combination with a blade, and a lug thereon having a transverse hole of angular cross section; of a handle, a fork carried thereby formed with eyes having alined openings of a size and configuration conforming with that of said hole, a plug shaped exteriorly to fit the hole and having a threaded opening in its smaller end, a set screw engaging said opening, and a shoulder on the screw consisting of a circular plate of a diameter greater than the opening in either eye.

3. In an agricultural implement, the combination with a blade, and a lug thereon having a transverse hole of angular cross section tapering throughout its length; of a handle, a fork carried thereby formed with eyes having alined openings of a size and configuration conforming with that of the larger end of said hole, a cone shaped exteriorly to fit the hole and having a threaded opening in its smaller end, a set screw engaging said opening, and a shoulder on the screw consisting of a circular plate of a diameter greater than the opening in either eye.

4. In an agricultural implement, the combination with a blade, and a lug thereon having a transverse hole tapering and serrated throughout its length; of a handle, a fork carried thereby formed with eyes having alined openings of a size and configuration conforming with that of the larger end of said hole, a cone serrated exteriorly to fit the hole, and means for holding the same removably in place.

5. In an agricultural implement, the combination with a blade, and a lug thereon having a transverse hole tapering and serrated throughout its length; of a handle, a fork carried thereby formed with eyes having alined openings of a size and configuration conforming with that of the larger end of said hole, a cone serrated exteriorly to fit the hole and having a threaded opening in its smaller end, a set screw engaging said opening, and a shoulder on the screw consisting of a circular plate of a diameter greater than the opening in either eye.

In testimony whereof I have hereunto subscribed my signature this the 28th day of April, A. D. 1909.

EDWARD M. NEWELL.

Witnesses:
FRANK H. ANDERSON,
JAMES B. EWING.